A. T. BEST & R. H. RICHMOND.
DRIVING CHAIN.
APPLICATION FILED MAR. 29, 1915.

1,183,718.

Patented May 16, 1916.
2 SHEETS—SHEET 1.

Inventors:-
Arthur T. Best & Reginald H. Richmond
By:- B. Singer
Atty.

A. T. BEST & R. H. RICHMOND.
DRIVING CHAIN.
APPLICATION FILED MAR. 29, 1915.

1,183,718.

Patented May 16, 1916.
2 SHEETS—SHEET 2.

UNITED STATES PATENT OFFICE.

ARTHUR THOMAS BEST AND REGINALD HERBERT RICHMOND, OF BIRMINGHAM, ENGLAND.

DRIVING-CHAIN.

1,183,718.  Specification of Letters Patent.  Patented May 16, 1916.

Application filed March 29, 1915. Serial No. 17,862.

*To all whom it may concern:*

Be it known that we, ARTHUR THOMAS BEST and REGINALD HERBERT RICHMOND, subjects of the King of Great Britain, residing at Oliver Street Works, Birmingham, in the county of Warwick, England, have invented a new and useful Improvement in Driving-Chains; and we do hereby declare the following to be a full, clear, and exact description of the same.

This invention relates to driving chains and is adaptable to driving chains for various kinds of machinery but has been more especially designed for driving chains for motor cycles.

The object of the invention is to provide an improved chain of the kind wherein spring means are provided to give a certain amount of elasticity, which is particularly desirable in motor cycle work in order to absorb the shocks due to the firing of the engine.

Our invention relates more particularly to any type of link chain such as the silent or block or roller type whereof the links comprise plates pivotally connected and formed with projections or abutments between which are spring means tending to hold some or all of the links at an angle relatively to adjacent links so that it requires a certain tension upon a length of the chain in order to bring the pivoted points of all the links thereof into alinement.

According to our invention we employ compression springs disposed between abutments carried by extensions formed upon the outer or upper side of certain links in such a way that when the chain is permitted to slacken at all it assumes an up and down or zig-zag form.

Figure 1:
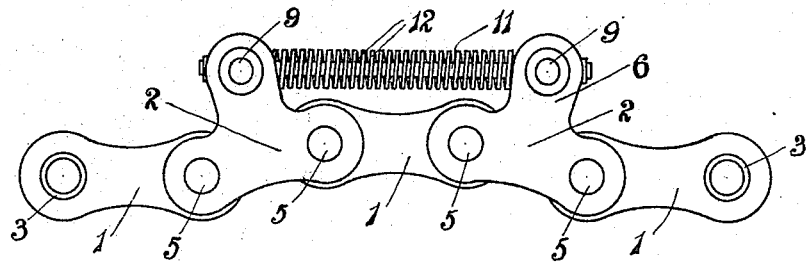
Figure 2:
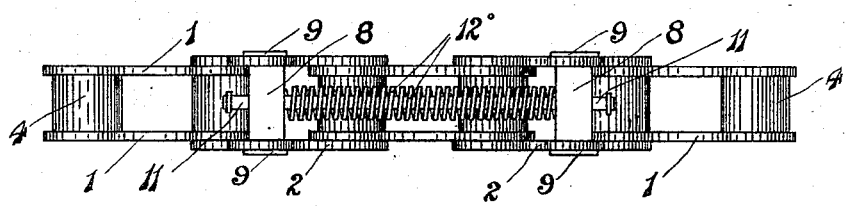
Figure 3:
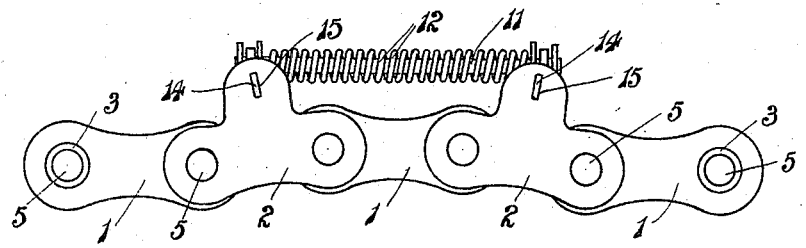
Figure 4:
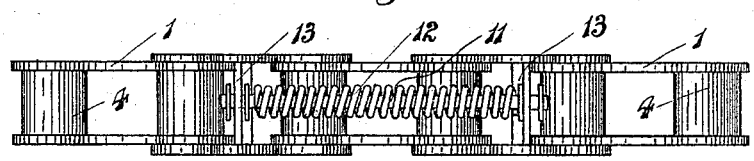
Figure 5:
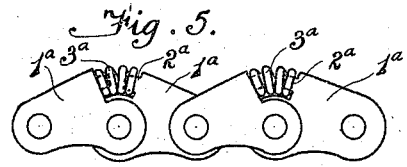
Figure 6:
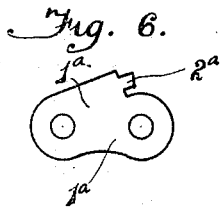
Figure 7:
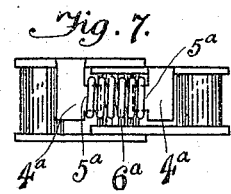
Figure 8:
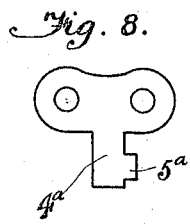
Figure 9:
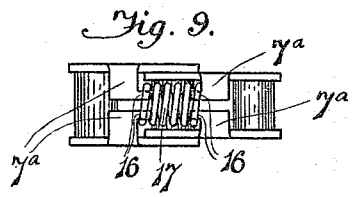
Figure 10:
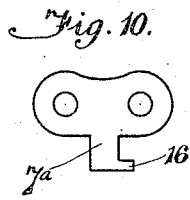
Figure 11:
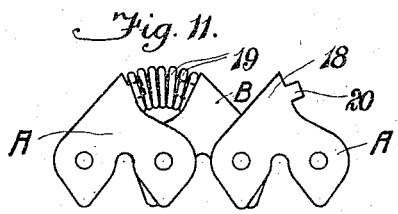
Figure 12:
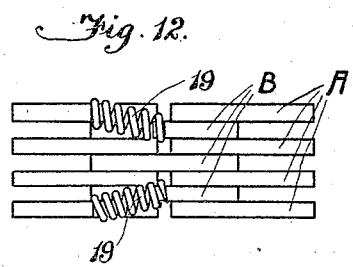
Figure 13:
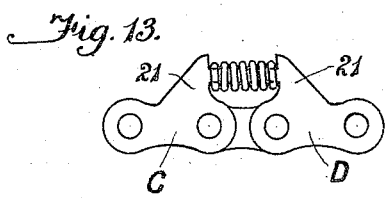
Figure 14:
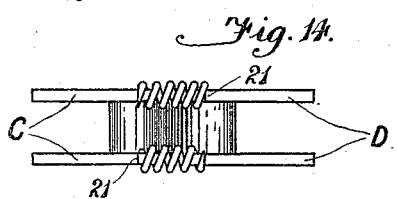
Figure 15:
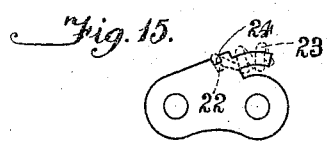
Figure 16:
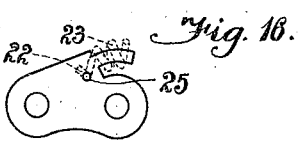

Referring to the accompanying drawings:—Figure 1. is an elevation showing one form of chain made in accordance with our invention. Fig. 2. is a plan of the same. Fig. 3. is an elevation of a modified form of chain. Fig. 4. is a plan of the same. Fig. 5. shows a form of chain made in accordance with another modification of our invention. Fig. 6. represents a blank showing a modified form of the plate. Fig. 7. shows another form of chain. Fig. 8 shows the corresponding blank. Fig. 9. shows a further form of chain. Fig. 10. shows the corresponding blank. Fig. 11. shows the application of our invention to a chain of the silent type. Fig. 12. is a plan of the same. Fig. 13. shows an application of our invention to a chain of the block type. Fig. 14. is a plan of the same. Fig. 15. shows a modified form of blank with means for retaining the spring in position. Fig. 16. shows an alternative method.

In carrying our invention into practice as illustrated upon the accompanying drawings at Figs. 1 to 4 a roller chain is shown comprising alternate inner and outer pairs of plates 1 and 2, the inner pairs 1 being provided with bushings 3 whereon the rollers 4 work and being united to the outer pairs 2 by means of pintles 5 passing through the bushings 3 in a well known manner, an upward or outward extension 6 being formed upon the plates forming the outer pairs and an abutment block 8 pivoted across the link and retained by parts 9 in the said extensions. Holes are provided in the abutment blocks 8 and a guide rod 11 passed through the holes in adjacent abutment blocks, a coiled spring 12 being disposed upon the rod and being of such length that its ends pressing against the abutments will tend to raise out of alinement the adjacent ends of the plates carrying the abutments and so draw together the pintles at the farther ends of the said plates and shorten the effective unstressed length of the chain. The guide rods may have any convenient form of heads to prevent them from being withdrawn from the abutment plates, but are of sufficient length to permit the chain to take the curvature of the chain wheel or like.

Where a special link is employed for uniting the ends of the chain one of such heads for that particular link may preferably be a detachable nut screwed upon the rod for easy detachment.

The chain illustrated at Figs. 3 and 4 is similar but is of a somewhat lighter type, the abutment blocks being replaced by plates 13 provided with lugs 14 adapted to fit into slots 15 in the plates.

It will be seen that according to these forms the abutment may be disposed upon alternate links preferably upon each pair of outer plates for greater uniformity (two springs being employed for every eight links), but it is clear that links may be omitted and a less number of springs employed as desired.

Referring now to Figs. 5 and 6, the lower sides of the plate are of the usual form but each plate has an abutment 1ª formed preferably near and facing one end of its upper surface. A nose or projection 2ª may also be formed in the middle of the abutment to retain the end of the spring 3ª. The abutments formed upon adjacent plates are disposed facing one another and the spring 3ª placed with one end over each of the noses 2ª, thereby pressing the abutments apart and raising the pivotal point of the two links out of the general alinement. The noses may either be of curved form as shown in Fig. 5 adapted to overlap considerably as the chain is straightened or they may be merely straight upwardly sloping projections not sufficiently long to meet and overlap as in the blank shown at Fig. 6.

In another modification as shown at Figs. 7 and 8 the plates may be formed of blanks of the usual form but with an approximately perpendicular extending portion 4ª upon the upper part provided with a horizontal nose 5ª. Such extending portions upon adjacent links may be bent over at right angles as shown at Fig. 7 so as to lie over the links parallel to the pintles or like, the noses 5ª facing each other and serving to retain a coiled spring 6ª of preferably oblong section. The extensions may be carried only upon one plate of each pair and may be bent in until the nose is over the center of the chain, or the extensions 7ª may be carried by both plates as shown at Figs. 9 and 10 each having a nose 16 at its extreme end and the two noses being inclosed by the end of a spring 17 of oblong section. It will also be clear that more than one spring may be employed in corresponding positions to those in which we have described the use of a single spring. Moreover there is no necessity for every link to be provided with an abutment, as there might be intermediate links of common form, a pair of links of the special form only occurring at (say) every third or fourth pintle or the like.

The various forms of plates described are applicable to chains of the "silent" type as illustrated at Figs. 11 and 12 with the necessary modifications in the form of the plates, and a pair of plates A and B provided with abutments 18 and suitable springs 19 may be introduced in such chains in positions varying according to the number or arrangement required.

When employed upon a chain of the "silent" type abutments may be formed either upon two links actually connected to the same pivot as shown in the drawings or upon adjacent links in the same longitudinal row and the noses 20 would be suitably bent.

As applied to a chain of the block type as in Figs. 13 and 14 the abutments 21 are preferably formed upon each adjacent pair of plates C and D.

The springs may simply be retained in position by the fact of their surrounding the noses, in which case they can be very quickly removed or replaced by bending the chain sharply inward, or they may be provided with special means for retaining them. For example as shown at Fig. 15 the end 22 of the spring 23 may be passed through a slot 24 and bent over into an ear; or the end may be passed through a hole 25 in the plate as shown at Fig. 16.

Although these further modifications of the invention are intended primarily for use on motor cycles, yet they will be of great utility in all drives where the source of power or the load is of such a character as to cause jerks or impulsive shocks on the chain. The springs may operate between outer plates only, or inner plates only, or between each pair of inner and outer plates.

What we claim is:—

1. In a driving chain of the type referred to the combination of a plurality of links, abutments formed on the upper edges of some of said links, and compression springs disposed between the abutments in such a manner as to raise the adjacent ends of the links carrying the said abutments out of the general alinement of the chain.

2. In a driving chain of the type referred to the combination of a plurality of inner and outer links arranged alternately, abutments formed on the upper edges of some of said links, pintles connecting said links, spiral compression springs arranged between said abutments, and means carried by said abutments for retaining said springs securely in position.

3. In a driving chain of the type referred to the combination of a plurality of inner and outer links arranged alternately, abutments formed on the upper edges of some of said links, pintles connecting said links, and means including compression springs acting upon said abutments for normally shortening the effective distances between the outer pintles of groups of at least two links while the groups remain freely pivoted relatively to one another about said outer pintles.

4. In a driving chain of the type referred to the combination of a plurality of groups of links, compression springs tending to shorten some of said groups, and pivots between adjacent groups about which said groups remain freely pivoted.

5. In a driving chain of the type referred to the combination of a plurality of links; certain of which are formed with extensions upon the outer sides thereof, abutments carried by said extensions, guide rods slidably connected to said abutments; and spiral compression springs surrounding said rods.

6. In a driving chain of the type referred to the combination of a plurality of links comprising alternate pairs of inner and outer plates; an abutment carried by each pair of outer plates, guide rods slidably connected to said abutments; and spiral compression springs surrounding said rods.

7. In a driving chain of the type referred to the combination of a plurality of links; certain of which are formed with extensions upon the outer sides thereof, abutments pivotally carried by said extensions, guide rods slidably connected to said abutments; and spiral compression springs surrounding said rods.

In testimony whereof, we have signed our names to this specification in the presence of two subscribing witnesses.

ARTHUR THOMAS BEST.
REGINALD HERBERT RICHMOND.

Witnesses:
HAROLD K. HONESTER,
MARY J. PARKS.

Copies of this patent may be obtained for five cents each, by addressing the "Commissioner of Patents, Washington, D. C."